United States Patent
Brenner et al.

(10) Patent No.: US 9,805,035 B2
(45) Date of Patent: Oct. 31, 2017

(54) SYSTEMS AND METHODS FOR MULTIMEDIA IMAGE CLUSTERING

(71) Applicant: Shutterstock, Inc., New York, NY (US)

(72) Inventors: Eliot Brenner, New York, NY (US); Manor Lev-Tov, Brooklyn, NY (US); Heath Hohwald, Logrono (ES); Maggie J. Xiong, Roselle Park, NJ (US)

(73) Assignee: SHUTTERSTOCK, INC., New York, NY (US)

( * ) Notice: Subject to any disclaimer, the term of this patent is extended or adjusted under 35 U.S.C. 154(b) by 415 days.

(21) Appl. No.: 14/644,301

(22) Filed: Mar. 11, 2015

(65) Prior Publication Data
US 2015/0310010 A1    Oct. 29, 2015

Related U.S. Application Data

(60) Provisional application No. 61/952,172, filed on Mar. 13, 2014.

(51) Int. Cl.
*G06F 17/30*    (2006.01)

(52) U.S. Cl.
CPC .... *G06F 17/30038* (2013.01); *G06F 17/3053* (2013.01); *G06F 17/30106* (2013.01); *G06F 17/30268* (2013.01); *G06F 17/30598* (2013.01)

(58) Field of Classification Search
USPC .................................................. 707/730, 801
See application file for complete search history.

(56) References Cited

U.S. PATENT DOCUMENTS

| | | | | |
|---|---|---|---|---|
| 4,564,945 | A * | 1/1986 | Glover | G11B 7/013 360/48 |
| 5,870,584 | A * | 2/1999 | Bennett | G06F 7/24 707/752 |
| 7,678,287 | B2* | 3/2010 | Landis | B82Y 10/00 216/22 |
| 2006/0179414 | A1* | 8/2006 | Martin | G06F 17/30038 715/764 |
| 2006/0184558 | A1* | 8/2006 | Martin | G06F 17/30867 |
| 2006/0280971 | A1* | 12/2006 | Landis | B82Y 10/00 428/826 |
| 2007/0011568 | A1* | 1/2007 | Hocevar | H03M 13/1114 714/758 |

(Continued)

*Primary Examiner* — Kim Nguyen
(74) *Attorney, Agent, or Firm* — McDermott Will & Emery LLP

(57) ABSTRACT

Computer image clustering systems and methods for conducting effective media searches by grouping multimedia documents tagged by keywords into a hierarchy of images configured to: (1) maintain a first database, (2) maintain an initial occurrence matrix, (3) maintain an occurrence matrix, (4) maintain a media file activation score for each media file in the first database, (5) generate a log version of the occurrence matrix, (6) maintain an inverse media file frequency value for each descriptive term in the first database, (7) generate a descriptive term frequency matrix and generate a list of document vectors in multidimensional space (list), and (8) organize and process each media file in the list into a high activation score category and a low activation score category.

28 Claims, 9 Drawing Sheets

(56) References Cited

U.S. PATENT DOCUMENTS

2010/0114890 A1* 5/2010 Hagar ............... G06F 17/30731
                                                707/737
2013/0335780 A1* 12/2013 Asai ................... G06K 15/1881
                                                358/2.1

* cited by examiner

TABLE 1 — 110, 100, 102, 104

| NO. | MULTI MEDIA FILES | KEYWORDS | | | | |
|---|---|---|---|---|---|---|
| | | SAND | WATER | SUNSET | TREES | GRASS |
| M1 | Fresh.jpg | 15 | 40 | 20 | 40 | 0 |
| M2 | Nature.jpg | 0 | 50 | 50 | 50 | 35 |
| M3 | Happiness.gif | 20 | 0 | 0 | 40 | 0 |
| M4 | Mountain.gif | 0 | 10 | 25 | 0 | 0 |
| M5 | Beach.jpg | 50 | 50 | 25 | 25 | 0 |
| M6 | Sky.jpg | 0 | 50 | 25 | 0 | 25 |
| | MFF | 3 | 5 | 5 | 4 | 2 |

TABLE 2 — 210, 200, 202, 204, 206

| NO. | MULTI MEDIA FILES | KEYWORDS | | | | | |
|---|---|---|---|---|---|---|---|
| | | SAND | WATER | SUNSET | TREES | GRASS | MFA VALUE |
| M1 | Fresh.jpg | 3 | 8 | 4 | 8 | 0 | 23 |
| M2 | Nature.jpg | 0 | 10 | 10 | 10 | 7 | 37 |
| M3 | Happiness.gif | 4 | 0 | 0 | 8 | 0 | 12 |
| M4 | Mountain.gif | 0 | 2 | 5 | 0 | 0 | 7 |
| M5 | Beach.jpg | 10 | 10 | 5 | 1 | 0 | 26 |
| M6 | Sky.jpg | 0 | 10 | 5 | 0 | 1 | 16 |

Fig. 2

TABLE 5 — 500

| MFF | SAND | WATER | SUNSET | TREES | GRASS |
|---|---|---|---|---|---|
|  | 3 | 5 | 5 | 4 | 2 |
| IMFF | 1/3 | 1/5 | 1/5 | 1/4 | 1/2 |

Fig. 5

TABLE 6 — 600

| IMG # | DIM 1 | DIM 2 |
|---|---|---|
| 1 | 0.7 | 0.2 |
| 2 | 0.8 | 0.3 |
| 3 | 0.9 | 0.1 |
| 4 | 0.2 | 0.9 |
| 5 | 0.1 | 0.95 |
| 6 | 0.15 | 0.85 |
| 7 | 0.45 | 0.6 |
| 8 | 0.5 | 0.65 |
| 9 | 0.4 | 0.60 |

Fig. 6

TABLE 7 — 700

| Centroid No. | IMAGES | DIM 1 | DIM 2 |
|---|---|---|---|
| 1 | 1,2,3 | 0.8 | 0.2 |
| 2 | 4,5,6,7,8,9 |  |  |
| 3 | 4,5,6 | 0.15 | 0.9 |
| 4 | 7,8,9 | 0.4 | 0.63 |

Fig. 7

SYSTEMS AND METHODS FOR MULTIMEDIA IMAGE CLUSTERING

BACKGROUND

1. Field of Disclosure

The present disclosure generally relates to an image clustering system for effective media search and retrieval, and, more particularly, systems and methods for grouping multimedia documents tagged by keywords into a hierarchy of images wherein the images are categorized by the subject matter of the images based on image keywords and user behavior data. The provisional patent application number 61/952,172 entitled "Image Clustering" was filed Mar. 13, 2014 and is incorporated herein by reference.

2. Brief Description of Related Art

In addition to data extraction and selection, classical image retrieval systems have been focused on the features of data representation and similarity measures for performance enhancement of image searches. Although associating keywords with images is a very helpful technique used for locating an image of interest, because keywords may have more than one meaning, context or point of reference, the keyword based image search may not always produce the desired results. Finding pertinent information may be a tedious task when a searched query leads to a result containing several apparently relevant but content wise irreverent search results. A user may be required to browse through several pages before landing on a desired page. For example, if a user conducts an image search for the keyword "apple" via a search query, the search results may include images for "Apple®" the company, as well as apple the fruit.

It is difficult for multimedia retrieval systems to precisely know which particular image is of interest to a given user. Displaying diverse search results of the searched query may cause presentation of various types of media files on the search result page. This may increase the probability of displaying the specific media file that is of interest to the given user on the search result page. Accordingly, multimedia retrieval systems need to make an attempt to boost the diversity of searched media files displayed on a search result page. To accomplish this goal, multimedia retrieval systems may need to organize multimedia files and have an access to the organized multimedia files while performing the search and displaying the search results.

Typical image retrieval systems may require a user to interact with the system by typing a textual query and the systems may often present series of relevant images on a search result page. It can be difficult for a user to browse through the search result page displaying a large number of images. Therefore, it is desirable to present diverse result set by thematically clustering the search results on an interface that is easier to navigate.

BRIEF SUMMARY

By way of introduction only, the present embodiments provide methods and systems for a computer image clustering system that conducts effective media searches by grouping multimedia documents tagged by keywords into a hierarchy of images configured to: (1) maintain a first database, (2) maintain an initial occurrence matrix, (3) maintain an occurrence matrix, (4) maintain a media file activation (MFA) score for each media file in the first database, (5) generate a log version of the occurrence matrix, (6) maintain an inverse media file frequency (IMFF) value for each descriptive term in the first database, (7) generate a descriptive term frequency matrix and generate a list of document vectors in multidimensional space (list), and (8) organize and process each media file in the list into a high activation score category and a low activation score category.

The foregoing discussion of the preferred embodiments has been provided only by way of introduction. Nothing in this section should be taken as a limitation of the claims, which define the scope of the invention.

BRIEF DESCRIPTION OF SEVERAL VIEWS OF THE DRAWINGS

FIG. 1 depicts an example of an initial occurrence matrix according to a preferred embodiment of the disclosed invention;

FIG. 2 depicts an example of an occurrence matrix according to a preferred embodiment of the disclosed invention;

FIG. 5 illustrates an exemplary table listing the Media File Frequency (MFF) and the IMFF values of keywords according to a preferred embodiment of the disclosed invention;

FIG. 6 depicts a table indicating a manner in which clusters are generated according to one embodiment of the disclosed invention;

FIG. 7 displays a table indicating a manner in which images are assigned to a specific centroid;

DETAILED DESCRIPTION OF THE PRESENTLY PREFERRED EMBODIMENTS

Figure 3:
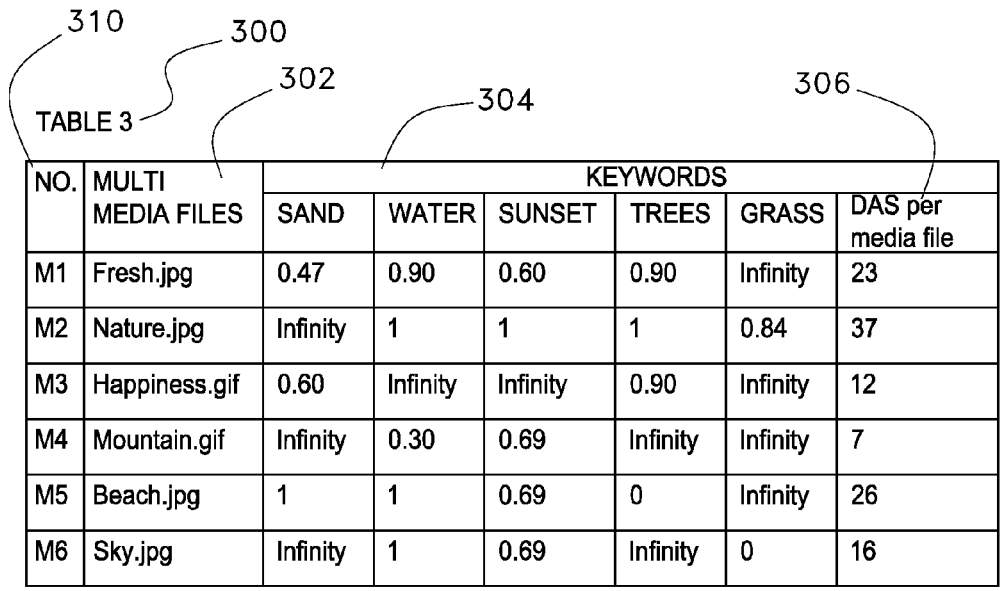
FIG. 3 depicts an example of the log version of the occurrence matrix.

The present disclosure describes computer implemented systems and methods, that may utilize an algorithm, to generate a hierarchy of media files on a graphical user interface to efficiently display search results in response to a user initiated media file search. In addition to displaying search results covering several aspects of a search term, the disclosed method also organizes search results in a display format that makes it easier for the user to locate a desired media file from large collection of media files.

Aspects of the present invention provide a computer media file search system for rapid retrieval of media files corresponding to a sequence of input display commands, the system comprising a programmable data processor operating under the control of a program to convert the display commands into data entries in an array of multi-bit data characters and words, each entry of the array corresponding to a set of descriptions of the media file to be displayed; and a scanned-raster display device for generating illuminated points on a display surface in response to applied data signals causing the programmable data processor to (1) maintain a first database, (2) maintain an initial occurrence matrix, (3) maintain an occurrence matrix, (4) maintain a MFA score for each media file in the first database, (5) generate a log version of the occurrence matrix, (6) maintain an inverse media file frequency (IMFF) value for each descriptive term in the first database, (7) generate a descriptive term frequency matrix and generate a list of document vectors in multidimensional space (list), and (8) organize and process each media file in the list into a high activation score category and a low activation score category.

The disclosed method may present several advantages. In one embodiment of the disclosed invention, a set of clusters of the media files may be made available to a user via a user interface to provide the user an ability to filter the media files in the clusters by the MFA value, and to traverse the clusters in a hierarchical fashion.

Clustering of images can be a useful technique for boosting the diversity of results of an image search system. Clustering may provide a possible resolution to the previously illustrated quandary. For instance, if the entire collection of images that matches with the search query "apple" is assigned to a specific cluster, a downstream algorithm can input the cluster identifiers for each image to ensure that a sufficiently diverse set of results are displayed. The diversity of the media files in the search result can be measured by the number of different clusters to which the images present in the result set belong.

When a user examines the results of a multimedia search system, for example by clicking on one of the multimedia item shown in the search result page, the user indicates an interest in exploring the selected multimedia item. Typically, while the selected multimedia item may be similar to the desired multimedia item, the selected multimedia item might not be an exact match to the desired multimedia item which the user had in mind before initiating the search query. For example a user might search for the query "apple", and select an image of a red apple, but not be content with the particular image of the red apple. Perhaps the user may be looking for a red apple with a green leaf, but since no images of a red apple with a green leaf are returned in the original search result set, the user may instead select the best possible option from the images presented in the result set.

To enable continued exploration of the multimedia collection, the image retrieval system may present a set of images related to the selected multimedia document. Thus, each image presented by the image retrieval system is similar to the selected multimedia document in at least to a certain degree. In this case, the image cluster information can be very useful, because one way to find images that are similar to the selected multimedia document is to select an image from the set of images in the specific cluster to which the selected multimedia document belongs. Further refinements in selecting other images can be accomplished depending upon the desired level of the image hierarchy. For instance, the image retrieval system may decide to show some images in the same leaf cluster as the selected multimedia document but also show some images in ancestor clusters in an effort to present diverse search results.

The disclosed invention presents methods of grouping or clustering of images for easier image discovery. To present image search results on an interface that is easier to navigate, the disclosed system thematically clusters the search results. The disclosed system presents, in addition to the regular thumbnails and typically as a banner at the top of the result set, an additional series of thumbnails where each thumbnail is a representative image of the cluster. The disclosed system may be configured to parse each input display command to determine a type of media a user is seeking to search, wherein the type of media, for example, comprises a photographic image, a vector art, a film or an image sequence.

The user can then click on the cluster's representative image to view only the subset of the overall set of images related to the theme they are interested in. As an example, querying for the word "apple" may return a display of a set of image thumbnails including both apple the fruit and Apple the company. At the top of the result set the system might show two thumbnails representing the fruit cluster and the Apple company cluster. The disclosed invention groups and forms the relevant sets and clusters to present the aforementioned display.

The present invention provides methods for computer image clustering for conducting effective media search by grouping multimedia documents tagged by keywords into a hierarchy of images, the method comprising: (1) maintaining a first database comprising a first set of records, each record comprising a media file and a set of descriptive terms associated with the media file; (2) maintaining an initial occurrence matrix comprising rows of the media files in the first database, and columns of the unique descriptive terms associated with media files in the first database, wherein a descriptive term media file activation (DTMA) value at a given location (x, y) in the initial occurrence matrix indicates the number of times the unique descriptive term y appeared in the media file x; (3) maintaining MFA score for a next media file by performing the following operations, until the MFA score is computed for each media file in the first database: (a) identifying the next descriptive term, and configuring the MFA value of the next media file by adding the DTMA value at the location (the next media file, the next descriptive term) to the MFA value of the media file until each descriptive term in the occurrence matrix is processed; (b) generating a log version of the occurrence matrix by computing a log of each the DTMA value in the occurrence matrix; (c) maintaining an inverse media file frequency (IMFF) value for each descriptive term in the first database by generating a first value by aggregating the number of media files in which the descriptive term occurs in the first database, and taking a reciprocal of the first value; (d) generating a descriptive term frequency matrix and implementing dimensional reductions by using principal component analysis (PCA) of the descriptive term frequency matrix to generate a list of document vectors in multidimensional space (list); and (e) organizing and processing each media file in the list into a high activation score category if the MFA score of the media file exceeds a predefined threshold and in a low activation score category if the MFA score of the media file is less than the predefined threshold.

Figure 8:
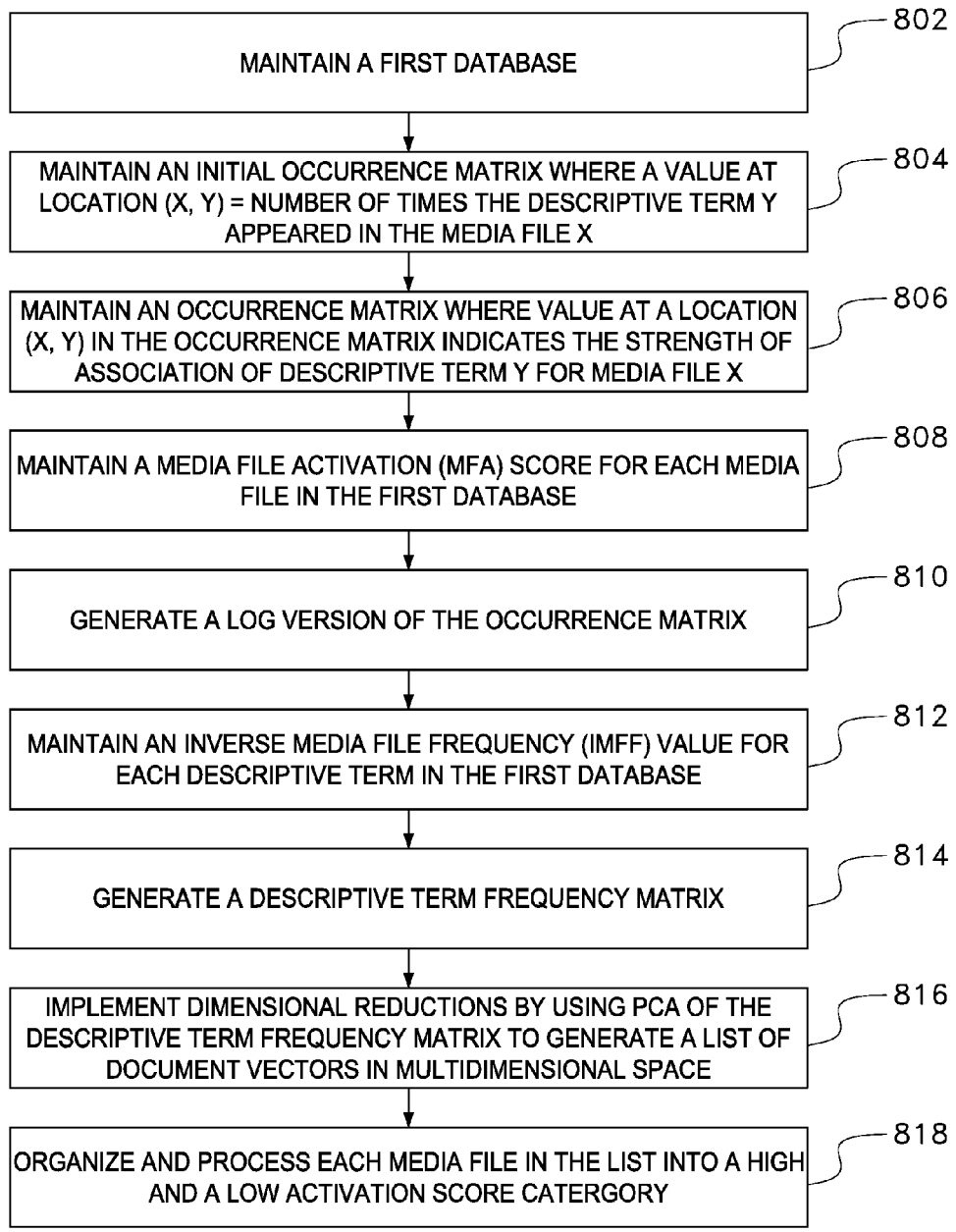
FIG. 8 is a flow chart illustrating the various steps implemented in grouping multimedia files tagged with keywords into a hierarchy.

FIG. 8 is a flow chart illustrating the various steps implemented in grouping multimedia files tagged with keywords into a hierarchy that reflects the subject matter of the media files based on the keywords and user behavior data. The process according to the disclosed invention may at block 802 maintain a first database comprising a first set of records, each record comprising a media file and a set of descriptive terms associated with the media file. In other words, the first database is a collection of multimedia documents tagged with stemmed keywords.

At block 804 the process may maintain an initial occurrence matrix comprising rows of the media files in the first database, and columns of the unique descriptive terms associated with media files in the first database, wherein a value at a given location (x, y) in the initial occurrence matrix indicates the number of times the unique descriptive term y appeared in the media file x. In other words, each row the initial occurrence matrix may represent a multimedia document, and each column of the initial occurrence matrix may represent a keyword, the value at the location (row, column) of the initial occurrence matrix can be marked with a non-zero value if the column's keyword is present in the document's keywords.

In a preferred embodiment of the disclosed invention the process may: (1) use the initial occurrence matrix to generate a MFF value for each descriptive term in the first database. The MFF value for a given descriptive term may be computed by aggregating the number of media files in which the given descriptive term occurs in the first database. (2) use the occurrence matrix to determine DTMA score for each keyword which is a positive weight to reflect how accurately the keyword represents the subject matter of the associated multimedia document. The DTMA score can be based on at least one of the following factors such as a customer behavior, a multimedia document content analysis, a direct user feedback, a multimedia document similarity, a semantic descriptive term analysis. (3) use the occurrence matrix to generate MFA value or score for each document in the first database. In other words, for each document i.e. each row in the matrix, the process may sum all of the DTMA sores for a given media file. An example of the initial occurrence matrix is illustrated in FIG. 1.

Table 1 referenced by the reference numeral 100 is illustrated in FIG. 1. Further, the disclosed search system maintains an initial occurrence matrix as shown in FIG. 1. The occurrence matrix is a M by N matrix, wherein each row in the occurrence matrix corresponds to a media file in the first database, for example, rows M1, M2, M3, M4, M5 and M6 correspond to media files Fresh .jpg, Nature .jpg, Happiness.gif, Mountain.gif, Beach .jpg, and Sky.jpg respectively. The field 110 refers to the placement of media files in the table 1, six media files are shown in FIG. 1, wherein the media file fresh.jpg is placed at the M1 row, which is the first row and the media file Sky.jpg is placed at the M6 row, which is the sixth row.

Keywords 104 field of table 1 indicates the columns, where each column has a corresponding unique descriptive term that may be associated with at least one media file in the first database. Table 1 shows five keywords or unique descriptive terms: Sand, Water, Sunset, Tree and Grass that are associated with at least one of the media files M1-M6 in the first database.

Now referring back to FIG. 8, the process of the disclosed invention may at block 806 maintain an occurrence matrix comprising rows of the media files in the first database, and columns of the unique descriptive terms associated with media files in the first database, wherein the DTMA value at a given location (x, y) in the occurrence matrix indicates the strength of association of descriptive term y for media file x. An example of the initial occurrence matrix is illustrated in FIG. 2.

FIG. 2 illustrates table 2 referenced by the reference numeral 200. The disclosed search system may maintain an occurrence matrix as shown in FIG. 2. The occurrence matrix shown in table 200 is a M by N matrix, wherein each row in the occurrence matrix corresponds to a media file in the first database, for example, rows M1, M2, M3, M4, M5 and M6 correspond to media files Fresh .jpg, Nature .jpg, Happiness.gif, Mountain.gif, Beach .jpg, and Sky.jpg respectively. The field 210 refers to the placement of media files in the table 2. Six media files are shown in FIG. 2, wherein the media file fresh.jpg is placed at the M1 row, which is the first row and the media file Sky.jpg is placed at the M6 row, which is the 6th row.of table 200.

Keywords 204 field of table 2 indicate the columns, where each column has a corresponding the unique descriptive term or keywords that may be associated with at least one media file in the first database. Table 2 shows five keywords or unique descriptive terms: Sand, Water, Sunset, Trees and Grass that are associated with at least one of the media files M1-M6.

Field 206 in table 2 indicates a media file activation (MFA) value for each media file. The MFA value is computed for each row in the first database by aggregating each DTMA value in the given row. As described above, table 200 in FIG. 2 illustrates a series of MFA values computed for the media files M1-M6. For example, the MFA values for the media files Fresh.jpg, Nature .jpg, Happiness.gif, Mountain-.gif, Beach .jpg, and Sky.jpg is 23, 37, 12, 7, 26, and 16 respectively.

Now referring back to FIG. 8, at block 808 the process may maintain a media file activation (MFA) score for a next media file by performing the following operations, until the MFA score is computed for each media file in the first database: identifying the next descriptive term, and configuring the MFA value of the next media file by adding the DTMA value at the occurrence matrix (the next media file, the next descriptive term) to the MFA value of the media file until each descriptive term in the occurrence matrix is processed.

The DTMA value may be based on at least one of a customer behavior, a multimedia document content analysis, a direct user feedback, a multimedia document similarity, a semantic descriptive term analysis. At block 810 the process may generate a log version of the occurrence matrix by computing a log of each the DTMA value in the occurrence matrix. The DTMA value may indicate a positive weight value for each descriptive term in the occurrence matrix reflecting how accurately the descriptive term represents the subject matter of the associated media file. An example of the log version of the occurrence matrix is illustrated in FIG. 3.

Referring now to FIG. 3, illustrating table 3, referenced by the reference numeral 300. The occurrence matrix shown in table 300 is a 6 by 5 matrix, where rows M1, M2, M3, M4, M5 and M6 correspond to media files Fresh .jpg, Nature .jpg, Happiness.gif, Mountain.gif, Beach .jpg, and Sky.jpg respectively. The field 310 refers to the placement of media files in the table 3. Six media files are shown in FIG. 3, wherein the media file fresh.jpg is placed at the M1 row, which is the first row and the media file Sky.jpg is placed at the M6 row, which is the sixth row.

Keywords 304 field of table 3 indicate the columns, where each column has a corresponding unique descriptive term that may be associated with at least one media file in the first database. Table 3 shows five keywords or unique descriptive terms: Sand, Water, Sunset, Tree and Grass that are associated with at least one of the media files M1-M6.

Now referring back to FIG. 8, the process, according to a preferred embodiment of the disclosed invention, at block 810 may, for each row and each column of the occurrence matrix, configure a corresponding DTMA value at the location (x, y) of the log version of the occurrence matrix by taking a log of the DTMA value at the location (x, y) of the occurrence matrix. In other words, the DTMA value at the location (x, y) of the log version of the occurrence matrix as shown in table 300 of FIG. 3 is generated by taking a log of the DTMA value at the location (x, y) of the occurrence matrix as shown in table 200 of FIG. 2.

After generating the log version of the occurrence matrix at block 810, the process may maintain an inverse media file frequency (IMFF) value for each descriptive term in the first database at block 812. The IMFF value for each descriptive term may be generated by obtaining a first value by aggregating the number of media files in which the descriptive term occurs in the first database, and taking a reciprocal of the first value. This phenomenon is illustrated in FIG. 10.

Figure 10:
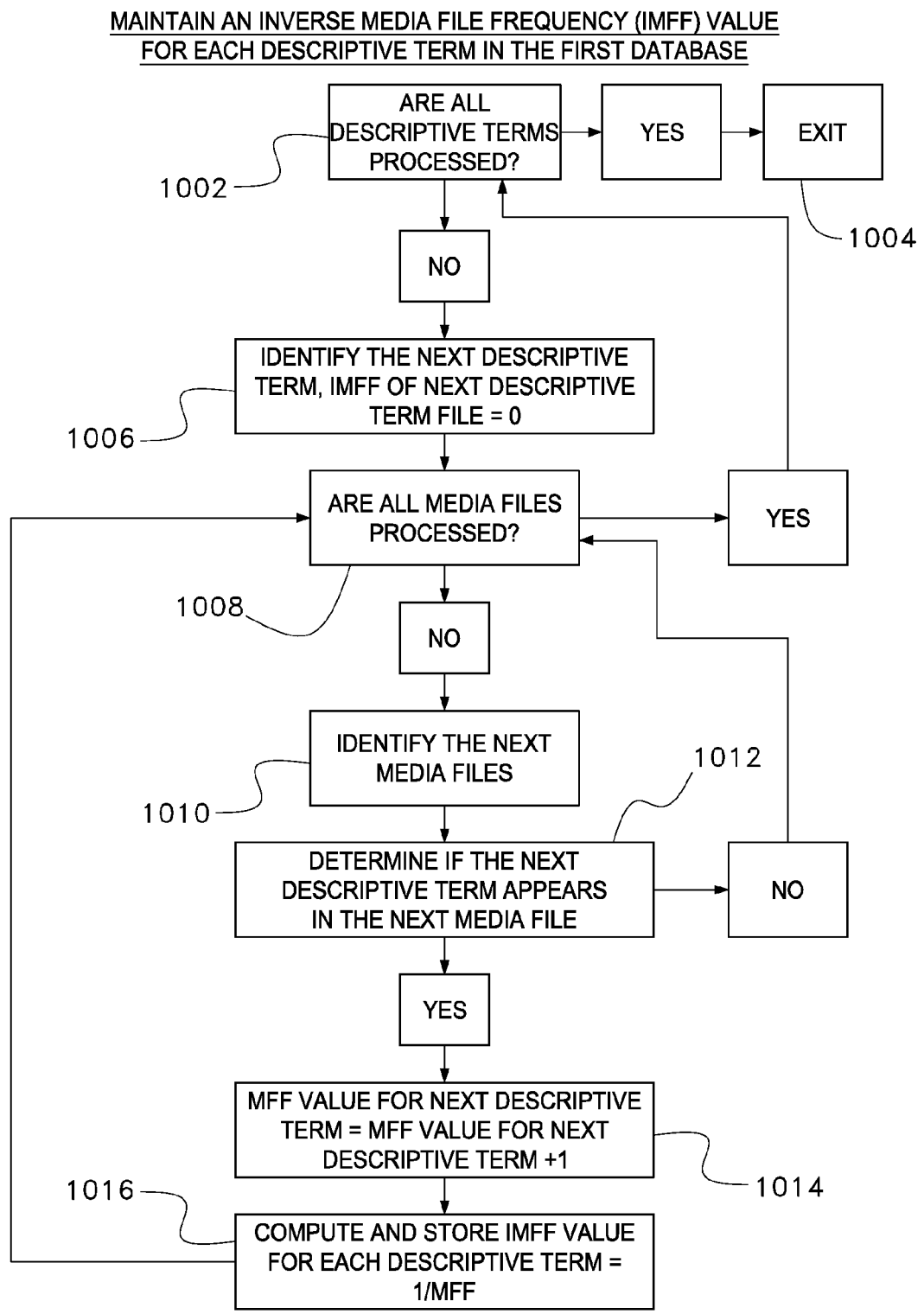
FIG. 10 depicts a flow chart illustrating a manner in which the IMFF value is maintained.

Turning now to FIG. 10, which is a flow chart illustrating the manner in which the Inverse Media File Frequency (IMFF) value is maintained. The process according to the disclosed invention may generate IMFF value for one media file at a time until all of the media files in the first database are processed. For example, the process may determine whether all descriptive terms or keywords are processed at block 1002.

If it is determined at block 1002 that all media files are not yet processed, then the process moves to block 1006 to identify the next descriptive term for which IMFF value is to be generated and set the IMFF score of the next descriptive term to zero. Alternatively, if at block 1002 it is determined that MFA score for each descriptive term in the first database is generated i.e. all descriptive terms are processed, then the process moves to block 1004 to exit the process. Thereafter, as described above in conjunction with FIG. 8, the process may move back to block 814 illustrated in FIG. 8.

Still referring to FIG. 10, the process moves from block 1006 to block 1008. If it is determined at block 1008 that MFF score is not generated for each media file in the first database, then the process moves to block 1010 to identify the next media file. If at block 1008 it is determined that MFF score has been generated for all media files, then the process moves to block 1002. At block 1012 the process determines if the next descriptive term appears in the next media file.

If the next descriptive term appears in the next media file, then the process configures the MFF value for next descriptive term to the MFF value for next descriptive term +1 at block 1014. The process then computes and stores IMFF value for each descriptive term by taking a reciprocal of the MFF value at block 1016. Alternatively, if at block 1012 it is determined that if the next descriptive term does not appear in the next media file, then the process moves to block 1008.

An example of the IMFF value generation is illustrated in table 500 in FIG. 5. The table 500 in FIG. 5 is a 2 by 5 matrix, where the first row 504 refers to number of occurrences i.e. MFF value for the keywords 502, and the second row 506 refers to IMFF of the keywords 502. The columns 502 indicate five keywords or unique descriptive terms: Sand, Water, Sunset, Trees and Grass. As discussed above in conjunction with FIG. 8, the keyword "Sand" appears in three files in Table 100 in FIG. 1.

Thus, the number of occurrences 504 or MFF value in FIG. 5 for keyword "Sand" is three, and reciprocal of three is ⅓, thus IMFF value for the keyword "Sand" is ⅓. Similarly, MFF value for keyword "Water" is five, and reciprocal of five is ⅕, the MFF value for keyword "Sunset" is five, and reciprocal of five is ⅕. Likewise, the MFF value for keyword "Tree" is four, and reciprocal of four is ¼, and the MFF value for keyword "Grass" is two, and reciprocal of two is ½.

Now referring once again to FIG. 8, after generating the IMFF value for each descriptive term in the first database at block 812, the process may generate a descriptive term frequency matrix at block 814. This phenomenon is described in detail in conjunction with FIG. 11.

Figure 11:
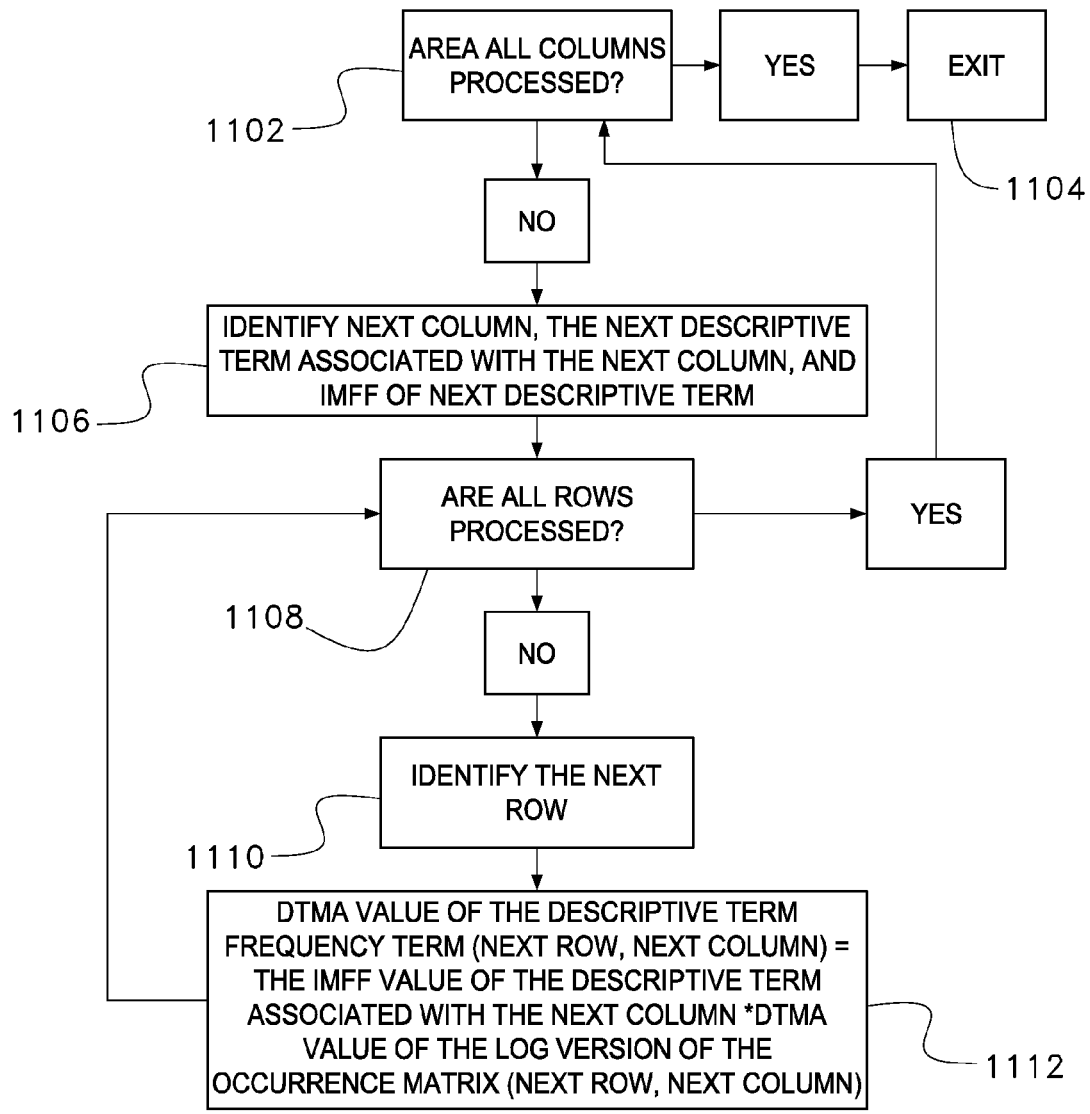
FIG. 11 is a flow chart illustrating a manner in which descriptive term frequency matrix is generated.

In FIG. 11, a flow chart illustrates the manner in which descriptive term frequency matrix is generated. The process according to the disclosed invention may determine whether all columns of the log version of the occurrence matrix are processed at block 1102. If at block 1102 it is determined that all columns of the log version of the occurrence matrix are processed, then the process may exit at block 1104. Thereafter, as described below in conjunction with FIG. 8, the process may move back to block 816 illustrated in FIG. 8.

Alternatively, if at block 1102 it is determined that all columns of the log version of the occurrence matrix are not yet processed, then the process may move to block 1106 to identify next column of the log version of the occurrence matrix, the next descriptive term associated with the next column, and IMFF of next descriptive term from field 506 of the table 500 in FIG. 5.

At block 1108 the process may ascertain if all of the rows of the log version of the occurrence matrix are processed, if so the process may return to block 1102, otherwise the process may move to block 1110 to identify the next row. The process may configure the DTMA value of the descriptive term frequency matrix (next row, next column) by multiplying the IMFF value of the descriptive term associated with the next column and the DTMA value of the of the occurrence matrix (next row, next column). Thereafter the process may move back to block 1108.

Figure 4:
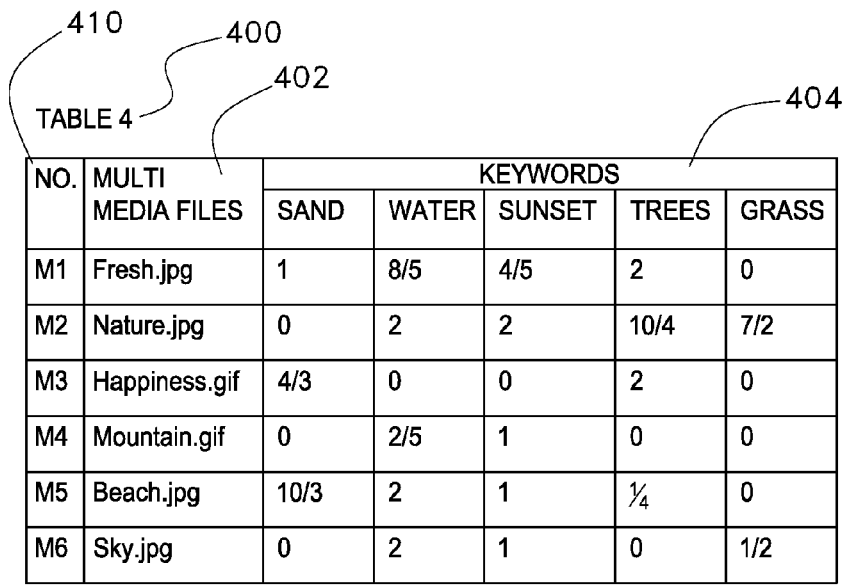
FIG. 4 shows an example of the Inverse Media File Frequency (IMFF) value generation.

An example of the IMFF value generation is illustrated in table 400 in FIG. 4. FIG. 4 depicts table 400 which is a 6 by 5 matrix, where rows M1, M2, M3, M4, M5 and M6 correspond to media files Fresh .jpg, Nature .jpg, Happiness.gif, Mountain.gif, Beach .jpg, and Sky.jpg respectively. The field 410 refers to the placement of media files in the table 4. Six media files are shown in FIG. 4. Keywords 404 field of table 4 indicate the columns corresponding the unique descriptive term that may be associated with at least one media file in the first database.

Table 4 shows five keywords or unique descriptive terms: Sand, Water, Sunset, Tree and Grass that are associated with at least one of the media files M1-M6. As discussed above in conjunction with FIG. 8, the keyword "Sand" appears in three files in Table 100 in FIG. 1. Thus, number of occurrences or MFF 106 in FIG. 1 for keyword "Sand" is three, reciprocal of three is ⅓.

After generating the IMFF value for each keyword in the occurrence matrix, the process may configure the DTMA value of the descriptive term frequency matrix (next row, next column) by multiplying the IMFF value of the descriptive term associated with the next column and the DTMA value of the log version of the occurrence matrix (next row, next column). The resulting matrix is illustrated in table 400 in FIG. 4. For example, as shown in table 200 in FIG. 2, the row M1 indicates media file Fresh.jpg and the value at the location occurrence matrix (Fresh.jpg, Sand) is three. As shown in table 500 in FIG. 5, the IMFF value for keyword Sand is ⅓. Thus, the DTMA value of the descriptive term frequency matrix (1,1) is one, since the IMFF value of the keyword Sand, is ⅓ and the DTMA value of the log version of the occurrence matrix (1,1), which is 3.

In other words, the descriptive term frequency matrix is generated by iteratively processing a next column in the occurrence matrix until each column in the occurrence matrix is processed by performing the following operations: (1) identify IMFF value of the descriptive term associated with the next column, and (2) iteratively process a next row in the occurrence matrix until each row in the occurrence matrix is processed, by performing the following operations: (a) configure the DTMA value of the descriptive term frequency matrix (next row, next column) by multiplying the IMFF value of the descriptive term associated with the next column by the DTMA value of the log version of the occurrence matrix (next row, next column).

Now referring back to FIG. 8, the process may implement dimensional reductions by using principal component analysis (PCA) of the descriptive term frequency matrix to generate a list of document vectors in multidimensional space (list) at block 816. Information about PCA provided in the provisional patent application for the disclosed invention, which is incorporated herein by reference.

Then the process may organize and process each media file in the list into a high activation score category if the MFA score of the media file exceeds a predefined threshold and in a low activation score category if the MFA score of the media file is less than the predefined threshold at block 818. Notably, the high activation media files may have the large amount of download data indicating that the weighted descriptive terms correlate well to the subject matter of the associated media files.

In other words, after generating the descriptive term frequency matrix at block 814, the process may implement dimensional reductions by using principal component analysis (PCA) of the descriptive term frequency matrix to generate a list of document vectors in multidimensional space (list). This phenomenon is described in detail in conjunction with FIG. 12.

Figure 12:
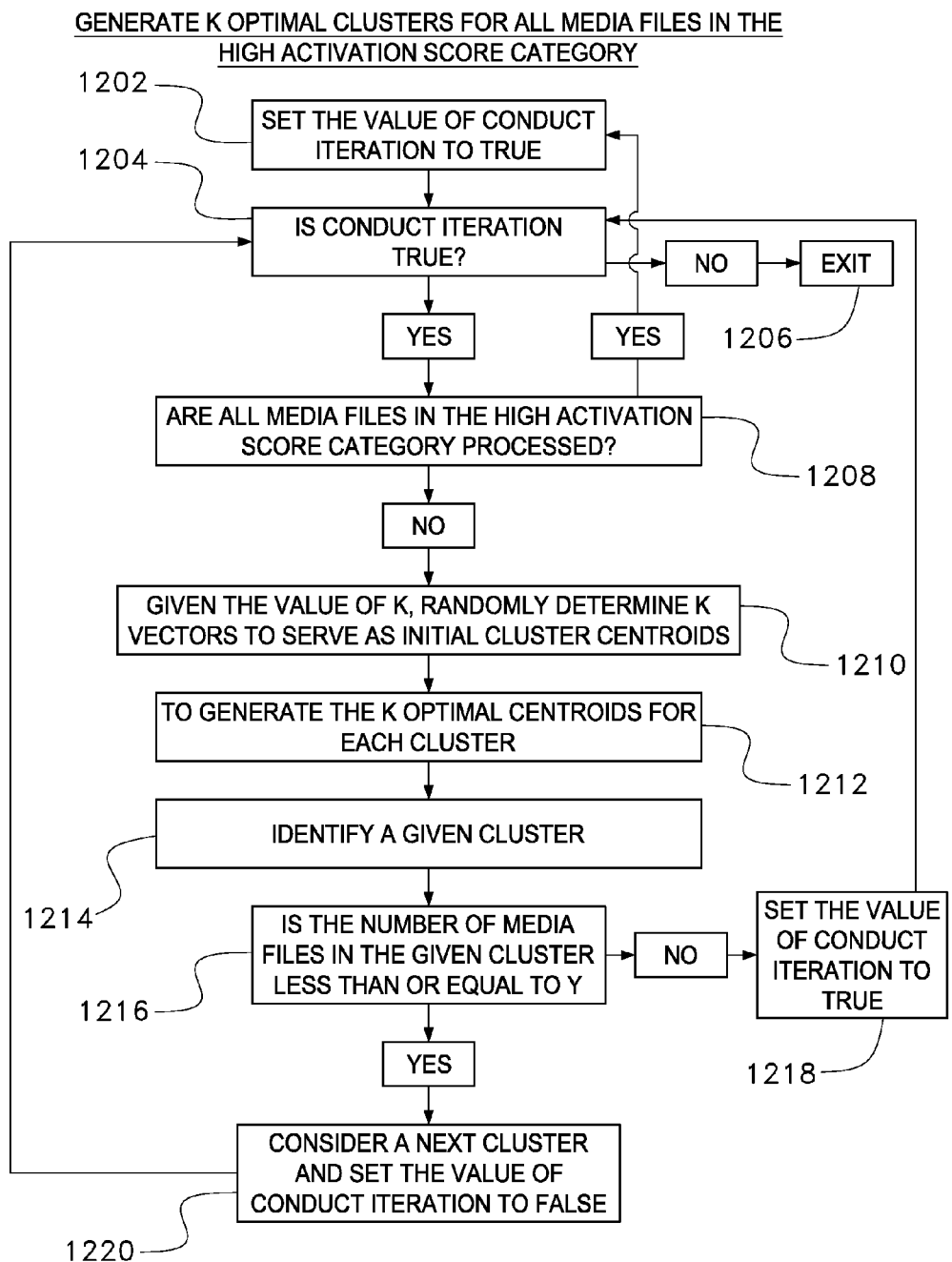
FIG. 12 is a flow chart showing a manner in which K optimal clusters are generated for all media files in the high activation score category.

Turning now to FIG. 12, which is a flow chart illustrating the manner in which K optimal clusters for all media files in the high activation score category are generated. In a preferred embodiment of the disclosed invention, the process may configure the value of a conduct iteration to true, and perform the following operations for each media file in the high activation score category while the value of the conduct iteration is true: (1) determine the value of a pair of initial points (K) and a maximum media files per centroid (Y) before applying the K-means clustering algorithm to generate K optimal centroids for a cluster, and (2) process a given cluster by performing the following operations until each cluster of the K optimal centroids is processed: (i) identify the given cluster, and (ii) consider a next cluster and set the value of conduct iteration to false if the number of media files in the given cluster is less than or equal to Y, otherwise set the value of conduct iteration to true.

The disclosed system may be configured to set the value of a conduct iteration to true, and perform the following operations for each media file in the high activation score category while the value of the conduct iteration is true: (1) determine the number of vectors to serve as initial cluster centroids of (K) and the maximum number of media files that can be contained in a single centroid (Y) (2) if the value of the variable conduct_iteration is true then determine if all media files in the high activation score category have been processed (3) randomly determine K vectors to serve as initial cluster centroids, if all media files in the high activation score category have not been processed (4) generate the K optimal centroids for each cluster (5) identify a given cluster and determine whether the number of media files in the given cluster is less than or equal to Y, and (6) consider a next cluster and set the value of conduct_iteration to false if the number of media files in the given cluster is less than or equal to Y, otherwise set the value of conduct_iteration to true.

This process is illustrated in the flow chart in FIG. 12. At block 1202 the process may set the value of a variable conduct_iteration to true, indicating that the number of media files in the given cluster is not greater than Y. The process may ascertain the values of the variables K and Y. The variable K may indicate the number of vectors to serve as initial cluster centroids. The variable Y may represent the maximum number of media files that can be contained in a single centroid.

At block 1204 the process may determine if the value of the variable conduct_iteration is true. The term conduct_iteration is the name of the variable in the software loop termination condition. If the process determines at block 1204 that the value of the variable conduct iteration is false, then the process may exit at block 1206. However, at block 1204 if the process determines that the value of the variable conduct_iteration is true, then the process may move to block 1208 to determine if all media files in the high activation score category have been processed.

If at block 1208 it is determined that all media files in the high activation score category have been processed, then the process may move back to block 1202. Alternatively, if at block 1208 the process determines that all media files in the high activation score category have not been processed, the process may, move to block 1210 to randomly determine K vectors to serve as initial cluster centroids,.

The process may after randomly determining K vectors to serve as initial cluster centroids, generate the K optimal centroids for each cluster at block 1212. At block 1214, the process may identify a given cluster and conduct an inquiry whether the number of media files in the given cluster is less than or equal to Y, at block 1216.

If the number of media files in the given cluster is less than or equal to Y then the process may move to block 1220 to consider a next cluster and set the value of conduct iteration to false. However, if the number of media files in the given cluster is more Y, then the process may move to block 1218 to set the value of conduct iteration to true. Then the process may move back to block 1204. This cycle continues until K optimal clusters are generated for each media file in the high activation score category. In a preferred embodiment of the disclosed invention, the initial points are selected in a random fashion. In another embodiment, the initial points are selected using heuristic techniques.

After generating K optimal clusters for each media file in the high activation score category, the process may perform the following operations for each media file in the low activation score category: (1) select the cluster with the nearest centroid after computing the nearest-neighbor centroid for each of the top level K clusters (2) traverse down the selected cluster's hierarchy after computing the nearest neighbor for sub cluster, and (3) associate the media file with the cluster comprising the nearest computed neighbor.

In other words, the process may, for each media file in the low activation score category, compute the nearest-neighbor centroid for each of the top level K clusters. Then the process may choose the cluster with the nearest centroid and traverse down that cluster's hierarchy, computing the nearest neighbor for sub cluster and associate the low activation document with the cluster that had the nearest computed neighbor.

This phenomenon is illustrated in FIG. 6 in which it is assumed for simplicity that there are only two dimensions: the first dimension indicated by the reference numeral 604, and the second dimension indicated by the reference numeral 606 to the list of document vectors 600 generated after implementing PCA of the descriptive term frequency matrix for nine images. In this example the process may set K=2 and Y=3. It is assumed that the images 1-9 are the media file in the high activation score category. The Dim, 1 604 and Dim 2, 608 for each image in this group are listed in the table 600, where both dimensions Dim 1 and Dim 2 have values in the range [0,1] for example for the image # 1 indicated by the reference numeral 608, the Dim 1 is 0.7 and Dim 2 is 0.2. Similarly, for the image # 9 indicated by the reference numeral 610, the Dim 1 is 0.4 and Dim 2 is 0.60.

FIG. 7 illustrates the assignments of the images 1-9 to centroids 1-4. Table 700 depicts centroid number field 702, the image identity field 704, the Dim 1 field indicated by the reference numeral 706 indicating the position of the image along the X axis, and the Dim 2 field indicated by the reference numeral 708 indicating the position of the image along the Y axis.

Now referring to FIG. 7 and FIG. 12 in parallel, as described above in conjunction with FIG. 12, the process may for a given value of (K=2) and (Y=3), generate 2 optimal centroids for each cluster at block 1212. A centroid may represent the center of mass of the clusters as determined by a nearest-neighbor assignment. In this example, because the value of K is set to 2, random starting centroids can be used. Thus, centroid 1 can be located at (0.8, 0.2) and images 1, 2, and 3 may be assigned to the centroid 1.

As described above in conjunction with at block 1218 of FIG. 12, the process may, inquire whether the number of media files in the given cluster is less than or equal to 3. Since the number of media files in the cluster 1 is equal to 3 the process may consider a next cluster containing the centroid 2. In other words, at this point the cluster 1 and centroid 1 contains three images, image 1, image 2 and image 3. At this point centroid 2 may be located at (0.3, 0.76) and images 4,5,6,7,8,9 will be assigned to it.

Since the number of media files in the centroid 2 is more than 3, the process may set value of the variable conduct_ iteration to false at block 1218 and return to block 1204. The process may generate 2 optimal centroids for example, the centroid 3 may be located at (0.15, 0.9) may be generated and contain images 4, 5, and 6. Likewise, the centroid 4 may be generated, which may be located at (0.4, 0.63) and contain images 7, 8, and 9. Since both the centroids 3 and 4 contain three images each, the process termination condition at block 1206 is triggered causing the process termination. Notably, the new centroids with their associated points may represent the optimal sub-cluster of the high activation media files.

Figure 13:
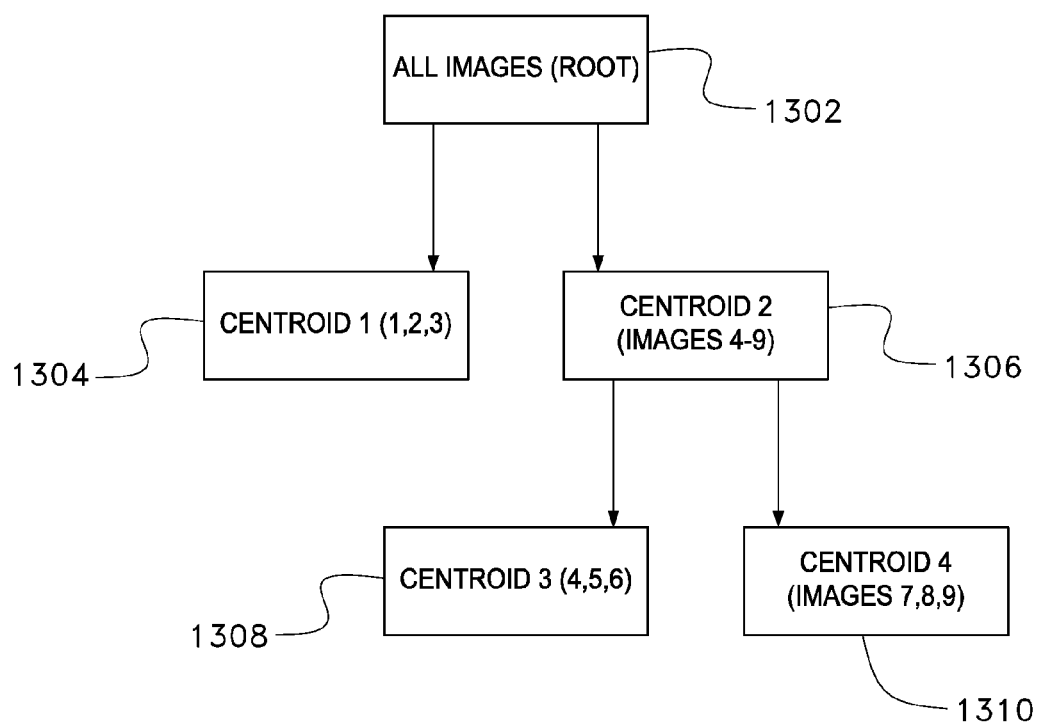
FIG. 13 displays a hierarchy of images showing clusters of images generated according to a preferred embodiment of the disclosed invention.

Now referring to FIG. 13, depicting a hierarchy of images showing clusters of images generated according to the disclosed invention. As described above in conjunction with FIG. 7, the root 1302 may contain all of the images 1-9 before any clusters are formed. Centroid 1 identified by the reference numeral 1304 contains images 1, 2, and 3. As described above, Centroid 2 identified by the reference numeral 1306 contains images 1-8 and 9. Similarly, centroid 3 and centroid 4 identified by the reference numeral 1308 and 1310, contain images 4, 5, and 6 and images 7,8, and 9 respectively. In this example, because the value of K is set to 2, random starting centroids can be used. Thus, centroid 1 can be located at (0.8, 0.2) and images 1, 2, and 3 may be assigned to the centroid 1.

The low activation documents may be assigned to centroids using the centroid locations found previously. As an example, if $10^{th}$ image has the 2-dimensional PCA values as 0.7 for dim 1 and 0.2 for dim 2, then the image 10 may be assigned to centroid 1 since the distance from image 10 in PCA-space to centroid 1 is lower than its distance to centroid 2. Likewise, if an Image 11 has the 2-dimensional PCA values as 0.18 for dim 1 and 0.93 for dim 2, then the Image 11 may be assigned first to centroid 2, and then to centroid 3 by again comparing distances to the nearest centroids in PCA space. Similarly, if an Image 12 has the 2-dimensional PCA values as 0.45 for dim 1 and 0.60 for dim 2, then the Image 12 may first be assigned to centroid 2, and then to centroid 4 by again comparing distances to the nearest centroids in PCA space.

Referring now to FIG. 1, depicting an example of the initial occurrence matrix in table 1 indicated by the reference numeral 100. The field 106 of table 1 indicates the number of occurrences for five descriptive terms in table 1. In Table 1 for example, the keyword "Sand" appears in three files: Fresh.jpg, Happiness.gif, and Beach.jpg, thus the MFF value for the keyword "Sand" is three. Similarly, the keywords "Water" and "Sunset" appear in five files, thus the MFF value for the keywords "Water" and "Sunset" is five. Likewise, the MFF value for the keyword "Tree" is four, since the keyword "Tree" appears in four files. Finally, the MFF value for the keyword "Grass" is two because the keyword "Grass" appears in two files.

The field 106 of table 1 indicates the MFA values for five descriptive terms in table 1. In Table 1 for example, the keyword "Sand" appears in three files: Fresh.jpg, Happiness.gif, and Beach.jpg, thus the number of occurrences for the keyword "Sand" is three. Similarly, the keywords "Water" and "Sunset" appear in five files, thus number of occurrences for the keywords "Water" and "Sunset" is five. Likewise, number of occurrences for the keyword "Tree" is four, since the keyword "Tree" appears in four files. Finally, number of occurrences for the keyword "Grass" is two because the keyword "Grass" appears in two files.

Turning to FIG. 2 now, the Field 206 of table 2 indicates a media file activation (MFA) score which is computed for each media file in the first database by identifying a next descriptive term, and configuring the MFA score of the next media file by adding the DTMA value at the location occurrence matrix (the next media file, the next descriptive term) to the MFA value of the media file until each descriptive term in the occurrence matrix is processed. This process is illustrated in a flow chart in FIG. 9.

Figure 9:
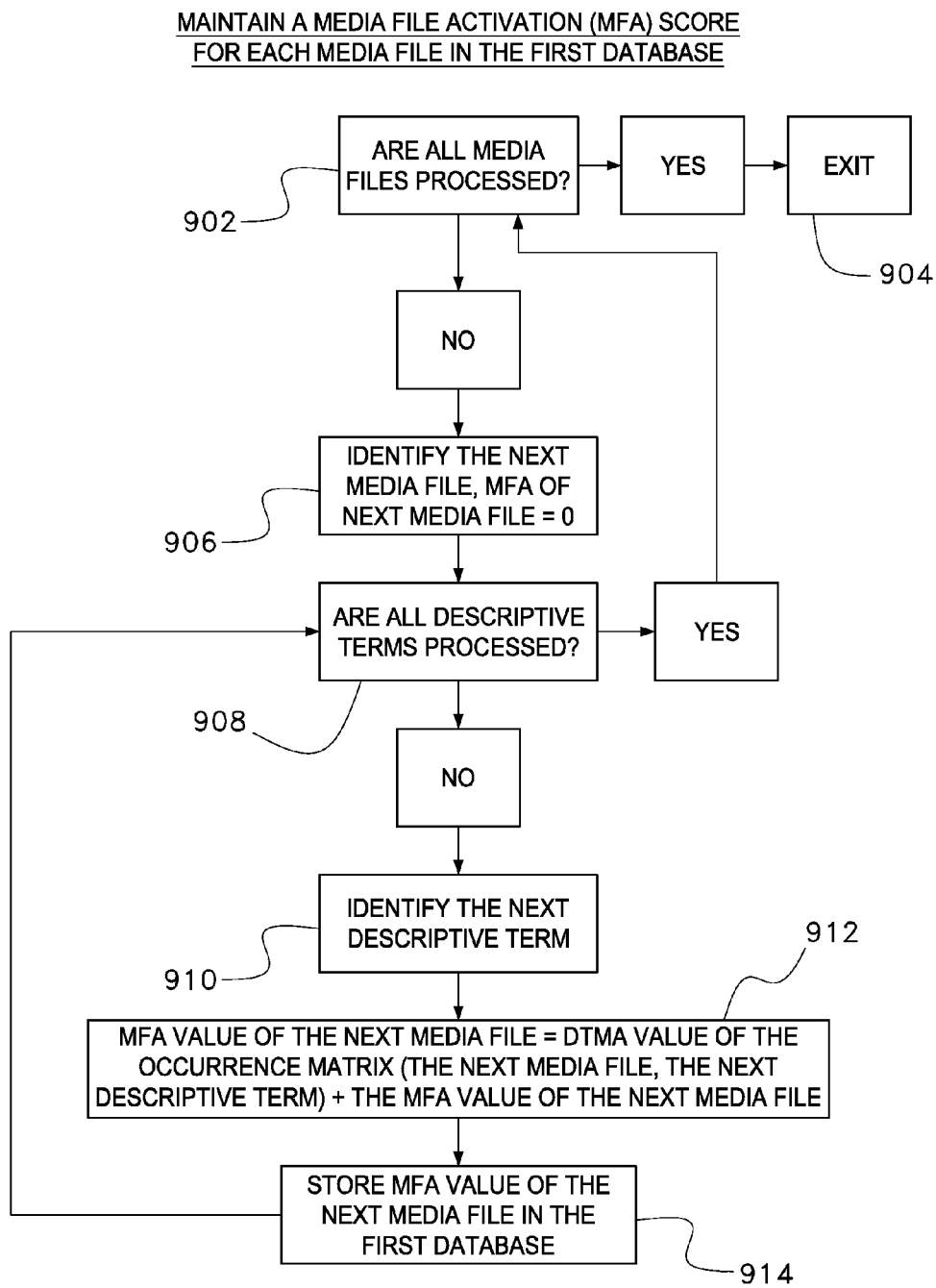
FIG. 9 illustrates a manner in which the Media File Activation (MFA) score is maintained.

Referring now to FIG. 9, illustrating the manner in which the Media File Activation (MFA) score is maintained. The process according to the disclosed invention may generate MFA score for one media file at a time until all the media files are processed. For example, the process may determine whether all media files are processed at block 902. If it is determined at block 902 that MFA score is not yet generated for all media files, then the process moves to block 906 to identify next media file for which MFA score is to be generated and set the MFA score of the next media file to zero.

This assignment of zero to clear up memory space assigned to the variable MFA value of the next media file is known to the skilled in the art. Alternatively, if at block 920 it is determined that MFA score for each media file in the first database is generated i.e. all media files are processed, then the process may exit at block 904. Thereafter, as described above in conjunction with FIG. 8, the process may move back to block 810 illustrated in FIG. 8.

The process may then determine whether all descriptive terms associated with the next media file are processed at block 908. If at block 908 it is determined that all descriptive terms in the first database are not yet processed, then the process moves to block 910, otherwise the process moves back to block 902.

At block 910 the process may identify a next descriptive term before proceeding to generate the MFA value of the next media file at block 912. The process aggregates the DTMA value of the occurrence matrix (the next media file, the next descriptive term) and the MFA value of the next media file in block 912 before storing the MFA value of the next media file in the first database. Then the process may move back to block 908 to repeat steps indicated in blocks 908-914 until all descriptive terms associated with the next media file are processed. Accordingly, the steps indicated in blocks 902-914 are repeated until the MFA value is generated for each media file in the first database. This phenomenon is illustrated in FIG. 10.

Turning now to FIG. 10, which is a flow chart illustrating the manner in which the Inverse Media File Frequency (IMFF) value is maintained. The process according to the disclosed invention may generate IMFF value for one media file at a time until all of the media files in the first database are processed. For example, the process may determine whether all media files are processed at block 1002. If it is determined at block 1002 that all media files are not yet processed, then the process moves to block 1006 to identify next descriptive term for which IMFF value is to be generated and set the IMFF score of the next descriptive term to zero. Alternatively, if at block 1002 it is determined that MFA score for each descriptive term in the first database is generated i.e. all descriptive terms are processed, then the process exits at block 1004. Thereafter, as described above in conjunction with FIG. 8, the process may move back to block 814 illustrated in FIG. 8.

The process moves from block 1006 to block 1008. If it is determined at block 1008 that MFF score is not generated for each media file in the first database, then the process moves to block 1010 to identify the next media file. If at block 1008 it is determined that MFF score has been generated for all media files, then the process moves to block 1002. At block 1012 the process determines if the next descriptive term appears in the next media file. If the next descriptive term appears in the next media file, then the process configures the MFF value for next descriptive term to the MFF value for next descriptive term +1 at block 1014. The process then computes and stores IMFF value for each descriptive term by taking a reciprocal of the MFF value at block 1016. Alternatively, if at block 1012 it is determined that if the next descriptive term does not appear in the next media file, then the process moves to block 1008.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A computer image clustering system for conducting an effective media search by grouping multimedia documents tagged by keywords into a hierarchy of images, the system comprising:
    a programmable data processor operating under the control of a program to convert the display commands into data entries in an array of multi-bit data characters and words, each entry of the array corresponding to a set of descriptions of the media file to be displayed; and
    a scanned-raster display device for generating illuminated points on a display surface in response to applied data signals causing the programmable data processor to perform the following operations:
    maintain a first database comprising a first set of records, each record comprising a media file and a set of descriptive terms associated with the media file;
    maintain an initial occurrence matrix comprising rows of the media files in the first database, and columns of the unique descriptive terms associated with media files in the first database, wherein a value at a given location (x, y) in the occurrence matrix indicates the number of times the unique descriptive term y appeared in the media file x;
    maintain an occurrence matrix comprising rows of the media files in the first database, and columns of the unique descriptive terms associated with media files in the first database, wherein a descriptive term media file activation (DTMA) value at a given location (x, y) in the occurrence matrix indicates the strength of association of descriptive term y for media file x;
    maintain a media file activation (MFA) score for a next media file by performing the following operations, until the MFA score is computed for each media file in the first database:
        identify the next descriptive term, and configure the MFA value of the next media file by adding the DTMA value at the occurrence matrix (the next media file, the next descriptive term) to the MFA value of the media file until each descriptive term in the occurrence matrix is processed;
    generate a log version of the occurrence matrix by computing a log of each of the DTMA values in the occurrence matrix;
    maintain an inverse media file frequency (IMFF) value for each descriptive term in the first database by generating a first value by aggregating the number of media files in which the descriptive term occurs in the first database, and taking a reciprocal of the first value;
    generate a descriptive term frequency matrix and implement dimensional reductions by using principal component analysis (PCA) of the descriptive term frequency matrix to generate a list of document vectors in multidimensional space (list); and
    organize and process each media file in the list into a high activation score category if the MFA score of the media file exceeds a predefined threshold and in a low activation score category if the MFA score of the media file is less than the predefined threshold.

2. The system of claim 1, further configured to parse each input display command to determine a type of media a user is seeking to search, wherein the type of media comprises a photographic image, a vector art, a film or an image sequence.

3. The system of claim 1, wherein the descriptive term frequency matrix is generated by iteratively processing a next column in the occurrence matrix until each column in the occurrence matrix is processed by performing the following operations:
    identify IMFF value of the descriptive term associated with the next column, and
    iteratively process a next row in the occurrence matrix until each row in the occurrence matrix is processed, by performing the following operations:

configure the DTMA value of the descriptive term frequency matrix (next row, next column) by multiplying the IMFF value of the descriptive term associated with the next column by the DTMA value of the log version of the occurrence matrix (next row, next column).

4. The system of claim 1, wherein the DTMA value reflects how accurately the descriptive term represents the subject matter of the multimedia document.

5. The system of claim 4, wherein the DTMA value is based on at least one of a customer behavior, a multimedia document content analysis, a direct user feedback, a multimedia document similarity and a semantic descriptive term analysis.

6. The system of claim 1, wherein the high activation media files have a large amount of download data indicating that the weighted descriptive terms correlate well to the subject matter of the associated media files.

7. The system of claim 6, wherein a centroid is the center of mass of the clusters as determined by a nearest-neighbor assignments.

8. The system of claim 7, wherein new centroids with their associated points represent the optimal sub-cluster of the high activation media files.

9. The system of claim 8, further configured to generate an image hierarchy, wherein the media files from the cluster located in proximity with the root node of the image hierarchy have a higher degree of similarity than the media files from the cluster located away from the root node of the image hierarchy.

10. The system of claim 1, further configured to set the value of a conduct iteration to true, and perform the following operations for each media file in the high activation score category while the value of the conduct iteration is true:
   determine the number of vectors to serve as initial cluster centroids of (K) and the maximum number of media files that can be contained in a single centroid (Y),
   if the value of the variable conduct_iteration is true then determine if all media files in the high activation score category have been processed,
   randomly determine K vectors to serve as initial cluster centroids, if all media files in the high activation score category have not been processed,
   generate the K optimal centroids for each cluster,
   identify a given cluster and determine whether the number of media files in the given cluster is less than or equal to Y, and
   consider a next cluster and set the value of conduct_iteration to false if the number of media files in the given cluster is less than or equal to Y, otherwise set the value of conduct_iteration to true.

11. The system of claim 10, wherein the initial points are selected in a random fashion and wherein the images are categorized by the subject matter of the images based on image keywords and user behavior data.

12. The system of claim 10, wherein the initial points are selected using heuristic techniques.

13. The system of claim 1 further configured to perform the following operations for each media file in the low activation score category:
   select the cluster with the nearest centroid after computing the nearest-neighbor centroid for each of the top level K clusters;
   traverse down the selected cluster's hierarchy after computing the nearest neighbor for sub cluster; and
   associate the media file with the cluster comprising the nearest computed neighbor.

14. The system of claim 1, further configured to formulate a set of clusters of the media files that are available to a user via a user interface to provide the user an ability to filter the media files in the clusters by the MFA value, and to traverse the clusters in a hierarchical fashion.

15. The system of claim 1, wherein the descriptive term media file activation (DTMA) value is a positive weight value for each descriptive term in the occurrence matrix to reflect how accurately the descriptive term represents the subject matter of the associated media file.

16. A method for computer image clustering for conducting effective media search by grouping multimedia documents tagged by keywords into a hierarchy of images, the method comprising:
   maintaining a first database comprising a first set of records, each record comprising a media file and a set of descriptive terms associated with the media file;
   maintaining an occurrence matrix comprising rows of the media files in the first database, and columns of the unique descriptive terms associated with media files in the first database, wherein a descriptive term media file activation (DTMA) value at a given location (x, y) in the occurrence matrix indicates the number of times the unique descriptive term y appeared in the media file x;
   maintaining a media file activation (MFA) score for a next media file by performing the following operations, until the MFA score is computed for each media file in the first database:
      identifying the next descriptive term, and configuring the MFA value of the next media file by adding the DTMA value at the location (the next media file, the next descriptive term) to the MFA value of the media file until each descriptive term in the occurrence matrix is processed;
   generating a log version of the occurrence matrix by computing a log of each the DTMA value in the occurrence matrix;
   maintaining an inverse media file frequency (IMFF) value for each descriptive term in the first database by generating a first value by aggregating the number of media files in which the descriptive term occurs in the first database, and taking a reciprocal of the first value;
   generating a descriptive term frequency matrix and implementing dimensional reductions by using principal component analysis (PCA) of the descriptive term frequency matrix to generate a list of document vectors in multidimensional space (list); and
   organizing and processing each media file in the list into a high activation score category if the MFA score of the media file exceeds a predefined threshold and in a low activation score category if the MFA score of the media file is less than the predefined threshold.

17. The method of claim 16, further comprises parsing each input display command to determine a type of media a user is seeking to search, wherein the type of media comprises a photographic image, a vector art, a film or an image sequence.

18. The method of claim 16, wherein the descriptive term frequency matrix is generated by iteratively processing a next column in the occurrence matrix until each column in the occurrence matrix is processed by performing the following operations:
   identifying IMFF value of the descriptive term associated with the next column, and
   iteratively processing a next row in the occurrence matrix until each row in the occurrence matrix is processed, by performing the following operations:

configuring the DTMA value of the descriptive term frequency matrix (next row, next column) by multiplying the IMFF value of the descriptive term associated with the next column by the DTMA value of the log version of occurrence matrix (next row, next column).

19. The method of claim 16, wherein the DTMA value reflects how accurately the descriptive term represents the subject matter of the multimedia document.

20. The method of claim 19, wherein the DTMA value is based on at least one of a customer behavior, a multimedia document content analysis, a direct user feedback, a multimedia document similarity and a semantic descriptive term analysis.

21. The method of claim 16, wherein the high activation media files have the large amount of download data indicating that the weighted descriptive terms have a high correlation with the subject matter of the associated media files.

22. The method of claim 21, wherein a centroid is the center of mass of the clusters as determined by a nearest-neighbor assignments.

23. The method of claim 22, wherein a new centroid and the associated points of the new centroid represents the optimal sub-cluster of the high activation media files.

24. The method of claim 16 further configured to set the value of a conduct iteration to true, and performing the following operations for each media file in the high activation score category while the value of the conduct iteration is true:

determining the number of vectors to serve as initial cluster centroids of (K) and the maximum number of media files that can be contained in a single centroid (Y), if the value of the variable conduct_iteration is true then determining if all media files in the high activation score category have been processed, randomly determining K vectors to serve as initial cluster centroids, if all media files in the high activation score category have not been processed, generating the K optimal centroids for each cluster, identifying a given cluster and determine whether the number of media files in the given cluster is less than or equal to Y, and considering a next cluster and set the value of conduct_iteration to false if the number of media files in the given cluster is less than or equal to Y, otherwise set the value of conduct_iteration to true.

25. The method of claim 24, wherein the initial points are selected in a random fashion.

26. The method of claim 24, wherein the initial points are selected using heuristic techniques.

27. The method of claim 16 further comprises performing the following operations for each media file in the low activation score category:

selecting the cluster with the nearest centroid after computing the nearest-neighbor centroid for each of the top level K clusters;

traversing down the selected cluster's hierarchy after computing the nearest neighbor for sub cluster; and associating the media file with the cluster comprising the nearest computed neighbor.

28. The method of claim 16, further comprising the step of formulating a set of clusters of the media files that are available to a user via a user interface to provide the user an ability to filter the media files in the clusters by the MFA value, and to traverse the clusters in a hierarchical fashion.

* * * * *